May 1, 1923.　　　　　　　　　　　　　　　　　1,453,348
R. GRIEVE ET AL
PUNCTUREPROOF PNEUMATIC TIRE
Filed May 8, 1922　　　　2 Sheets-Sheet 1

Inventors
R. Grieve.
J. W. Flading.
By
Lacey & Lacey, Attorneys

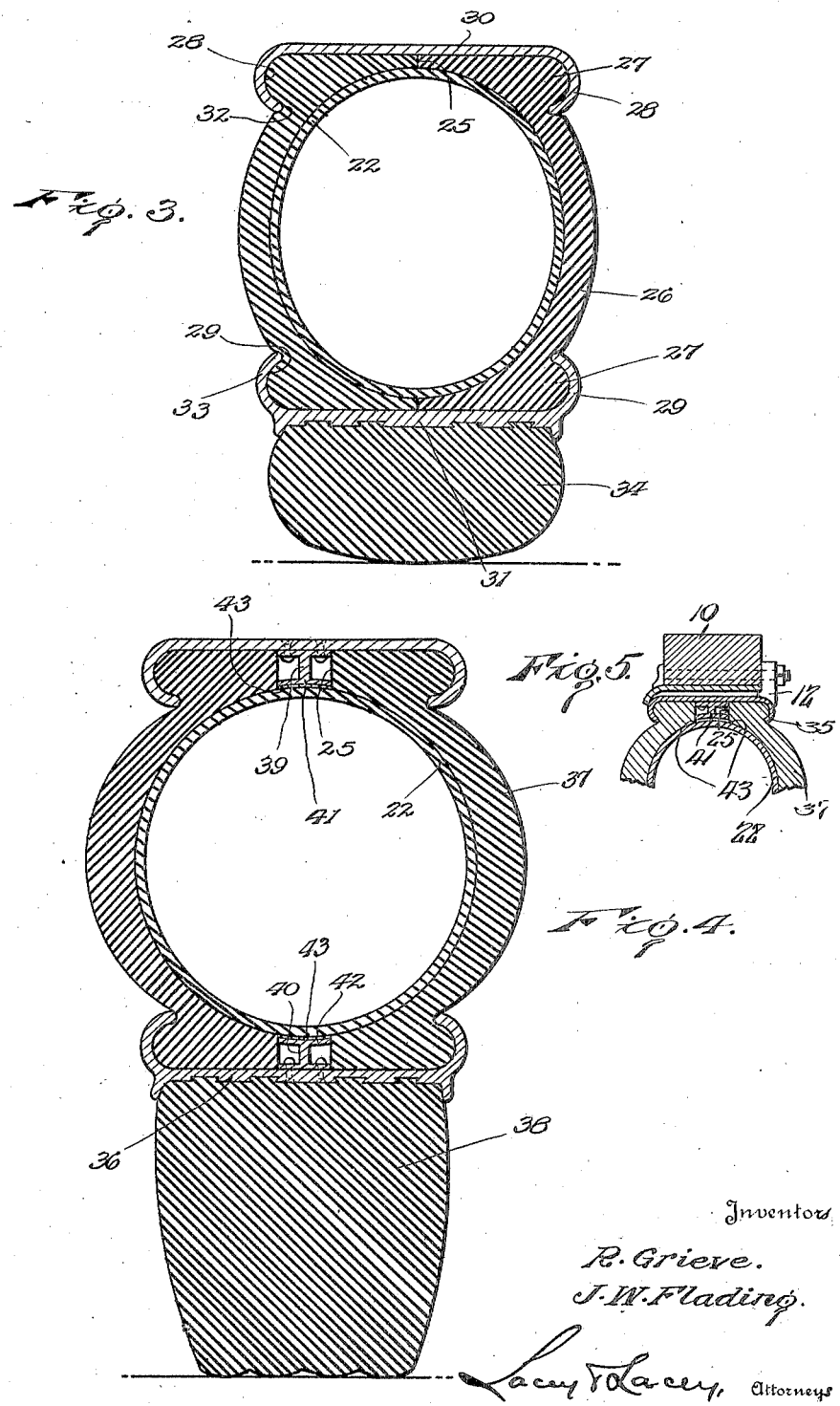

Patented May 1, 1923.

1,453,348

UNITED STATES PATENT OFFICE.

ROBERT GRIEVE AND JOHN W. FLADING, OF LANSING, MICHIGAN.

PUNCTUREPROOF PNEUMATIC TIRE.

Application filed May 8, 1922. Serial No. 559,371.

*To all whom it may concern:*

Be it known that we, ROBERT GRIEVE and JOHN W. FLADING, citizens of the United States, residing at Lansing, in the county of Ingham and State of Michigan, have invented certain new and useful Improvements in Punctureproof Pneumatic Tires, of which the following is a specification.

The present invention relates to pneumatic tires for vehicle wheels and the main object of the invention is to make tires of this class puncture proof and to prevent "blow outs" and in this manner considerably prolong the life of a tire and increase its wearing qualities.

Our improved tire may be used on vehicle wheels of any type, whether they are provided with clincher or smooth-faced rims. Another object of the invention is to provide a tire, that combines in itself the good qualities both of solid rubber tires and ordinary pneumatic tires, while eliminating the disadvantages of both. In other words, solid tires are heavy but puncture proof and pneumatic tires are comparatively light but non-puncture proof, while the tires forming the subject-matter of the present invention are puncture proof, as well as comparatively light and fully as resilient as the latter.

In the accompanying drawings:

Fig. 3 is a similar view to Fig. 2 showing the device as applied to the clincher type of rim, Fig. 4 is also a similar view to Fig. 2 constructed for a clincher tire casing and provided with spacing rings between the casing parts and Figure 5 is a transverse section similar to Figure 2 showing on a smaller scale, the securing means for the tire construction shown in Figure 4.

Figure 1:
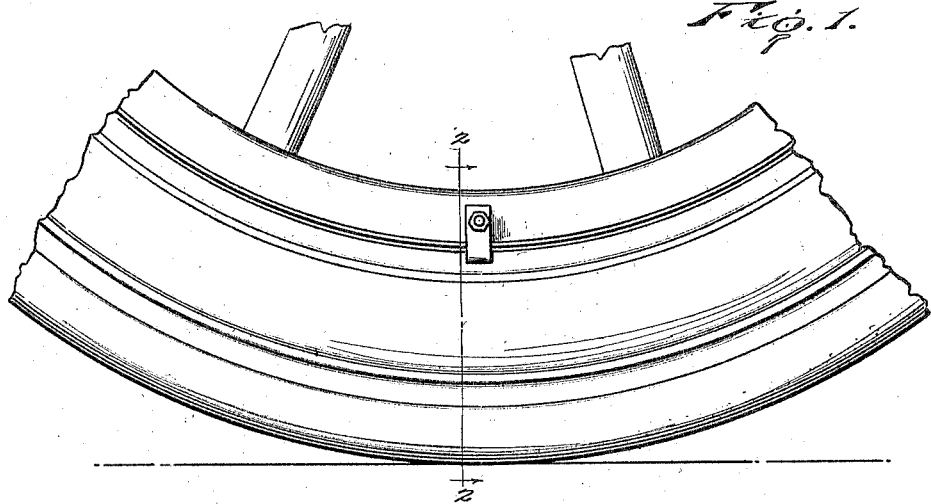
Figure 1 represents a fragmentary side elevation of a vehicle wheel provided with our improved tire.
Figure 2:
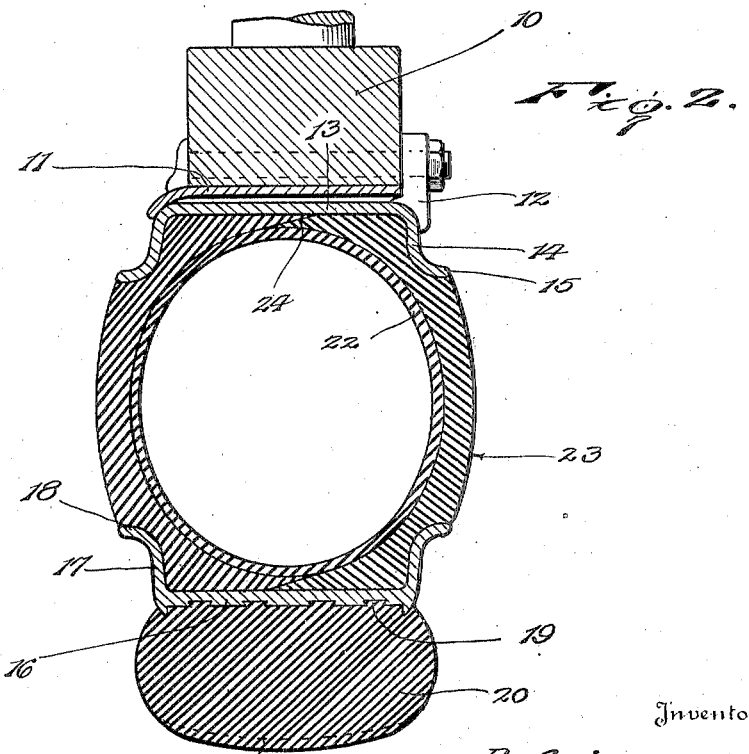
Fig. 2 is a transverse section along line 2—2 of Fig. 1 showing one type of rim and casing.

In Figs. 1 and 2 the reference numeral 10 represents the felloe of the vehicle wheel to which the demountable tire is secured in the usual manner by a shoe 11 and clamps 12.

The reference numeral 13 represents the inner annular rim preferably made of sheet metal and provided with radial flanges 14 having lateral edges 15. The inner portion of this rim is securely held between the shoe 11 and clamps 12.

An outer or tread rim 16 is the counter part of the inner rim 13 and is also provided with inwardly directed radial flanges 17 having lateral edges 18. The outer periphery of the tread rim 16 is preferably grooved, as at 19, to receive and firmly hold the annular tread member 20 which is preferably made of solid rubber or any other suitable material similar to ordinary solid rubber tires. The outer periphery of this tread member may be grooved, as at 21, or provided with suitable projections to make it skid-proof.

The reference numeral 22 represents a pneumatic tube which is of the usual construction with thin walls and this inner tube is surrounded by a casing 23. This casing is made in two mating halves divided on or near the medial, radial plane of the wheel and their abutting surfaces may be either beveled, as at 24, overlapping each other, or perpendicular, as at 25 and 26 in Figs. 3 and 4, respectively. The casing 23 fits snugly between the flanges 14 and 17 of the inner and outer rims 13 and 16 and conforms with the curvature of the edges 15 and 18 on the flanges. The casing 23 is of such dimensions that it spaces the inner rim 13 and the tread rim 16 apart a sufficient distance to accommodate the inner tube 22, when the latter is inflated.

In Fig. 3 a tire of the clincher type is illustrated and for this purpose the casing 26 which is also made in halves, being divided, as at 25, along the medial, radial plane of the wheel or as at 24 in Fig. 2. The casing is now formed with beads 27 adapted to fit snugly within the flanges 28 and 29 of the inner and outer rims 30—31, respectively. It will be observed that the edges 32 and 33 of the flanges are in this case bent to face each other. The tread rim 31 is also here provided with a solid rubber tread member 34 secured thereon in a similar manner to what has been described in Figs. 1 and 2.

Figs. 4 and 5 also show a clincher tire with inner and outer rims 35—36, a casing 37 and a tread member 38. In this case, however, the halves of the casing 37 do not abut against each other but are separated by means of spacing rings 39 and 40 secured respectively to the inner and outer rims on their opposing surfaces. These rings 39 and 40 whether of T or U-section, are provided with table-shaped elements 41 and 42 which are intended to contact with the adjacent portions of the inner tube 22 in order to prevent the latter from creeping into the space between the adjacent ends of the casing halves. These spacing rings 39 and 40 are rigidly secured by means of rivets or welding or they may be made integral with their respective rims 35 and 36. We may also provide a rubber or thin leather lining 43 between the table portion of the spacing rings and the inner tube 22 as well as between the latter and casing 26 in Figs. 2 and 3.

The tread member 38 shown in Fig. 4 is considerably deeper in section than what is shown in Figs. 1, 2 and 3 and this tread member 38 is suitable for truck wheels or wagons carrying heavy loads. For ordinary vehicles such as automobiles the tread members of solid rubber are much lighter so that the total weight of the tire, according to the present invention, is approximately the same as that of a pneumatic tire or a solid rubber tire for such light vehicles.

It will now be noted that the inner tube, as well as the casing, of a wheel of this construction is well protected from exterior injury as the outer periphery of the casing is exposed to very little wear and completely protected from nails or glass that the wheel might have to pass over on the roadway. All such obstructions or injurious matter can only cut into the solid rubber tread members 20, 34, and 38 and can certainly not reach beyond the tread rims 16, 31, and 36. All danger of puncture and "blow out" is consequently removed from a wheel of this construction and the only part that is exposed to wear will be the solid rubber tread which will naturally stand as much wear as any ordinary solid rubber tire. It will also be noted that the halves composing the casing may be exchanged from right to left as they are symmetrical along the medial, radial plane of the wheel.

The casing is preferably made in the same manner as the present pneumatic tire casings, that is to say, is composed of layers of rubber and fabric, but as the wear in the casing is not near as great as in ordinary pneumatic tires leather may be used instead of rubber and fabric.

It will be evident that the solid rubber tread rings 20, 34, and 38 may at times be dispensed with altogether, particularly for traffic over very bad roads, which are covered with sharp stones or glass. In that case, the tread rims would be made considerably thicker and more of the character of the usual iron tires.

Instead of making the casing in two sections, it may at times be preferable to make the casing in one piece and split it along a medial line around the inner periphery for inserting the pneumatic tube. The outer periphery would then be solid.

At times it may be desirable to extend the edges 25 of the casing 37 further in under the table portion 41 to abut against the central web portion of the T, providing a firm support.

Having thus described the invention, what is claimed as new is:

1. In a tire construction, an inner and an outer metallic rim, opposing flanges on said rims, a casing divided along the central radial plane of the tire defining annular abutting edges and adapted to enclose a pneumatic tube, an annular filler piece inserted between said abutting edges and said flanges having curved edges adapted to engage correspondingly shaped recesses provided along the adjacent portions of said casing, said filler piece having H-shaped cross section and means securing said inner metallic rim to a wheel felloe.

2. In a tire construction, an inner and an outer metallic rim, opposing flanges on said rims, a casing divided along the central radial plane of the tire defining annular abutting edges and adapted to enclose a pneumatic tube, an annular filler piece inserted between said abutting edges and said flanges having inwardly curved edges and said casing having corresponding beads engaging therewith, said filler piece having H-shaped cross section.

3. In a tire construction, an inner and an outer metallic rim, opposing flanges on said rims, a casing divided along the central radial plane of the tire defining abutting edges and adapted to enclose a pneumatic tube, said flanges having curved edges adapted to engage correspondingly shaped recesses provided along the adjacent portions of said casing, a spacing ring of H-shaped cross section for each of said rims adapted to separate said abutting edges and seated upon the opposing faces of said rims.

4. In a tire construction, an inner and an outer metallic rim, opposing flanges on said rims, a casing divided along the central radial plane of the tire defining abutting edges and adapted to enclose a pneumatic tube, said flanges having curved edges adapted to engage correspondingly shaped recesses provided along the adjacent portions of said casing, a solid annular tread member secured around the outer periphery of said outer rim, a spacing ring of H-shaped cross section for each of said rims adapted to separate said abutting edges and rigidly secured on the opposing faces of said rims, said spacing rings having each table portions, one of said table portions adapted to support the pneumatic tube, and forming substantially an uninterrupted continuation of the inner face of the shoe, the other of said table portions adapted to be seated upon the corresponding rim.

5. In a tire construction, an inner and an outer metallic rim, opposing flanges on said rims, a casing divided along the central radial plane of the tire defining abutting edges and adapted to enclose a pneumatic tube, an annular filler piece inserted between said abutting edges and having H-shaped cross section said casing engaging with said flanges and adapted to space said rims apart, the sections constituting said casing being interchangeable, and means securing said inner metallic rim to a wheel felloe, said means including an annular metallic shoe flanged along one edge and clamping bolts with dogs.

In testimony whereof we affix our signatures.

ROBERT GRIEVE. [L. S.]
JOHN W. FLADING. [L. S.]